(12) United States Patent
Matsunami (10) Patent No.: US 7,194,290 B2
(45) Date of Patent: Mar. 20, 2007

(54) PORTABLE WIRELESS TERMINAL DEVICE

(75) Inventor: Kanako Matsunami, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 510 days.

(21) Appl. No.: 10/743,411

(22) Filed: Dec. 23, 2003

(65) Prior Publication Data

US 2004/0137940 A1  Jul. 15, 2004

(30) Foreign Application Priority Data

Jan. 8, 2003  (JP) .............................. 2003-002425

(51) Int. Cl.
*H04M 1/00* (2006.01)
(52) U.S. Cl. ............. 455/575.1; 455/90.3; 348/333.06; 348/373
(58) Field of Classification Search ............. 455/550.1, 455/575.1, 566, 90.3; 348/333.06, 373
See application file for complete search history.

(56) References Cited

U.S. PATENT DOCUMENTS

2001/0004269 A1* 6/2001 Shibata et al. ......... 348/333.06

2003/0064758 A1* 4/2003 Mizuta et al. .............. 455/566

FOREIGN PATENT DOCUMENTS

| JP | 05-78077    | 10/1993 |
| JP | 11-215217   | 8/1999  |
| JP | 2001-156893 | 6/2001  |
| JP | 2001-169166 | 6/2001  |
| JP | 3088157     | 6/2002  |
| JP | 2003-338866 | 11/2003 |
| JP | 2004-134999 | 4/2004  |

* cited by examiner

*Primary Examiner*—Matthew D. Anderson
*Assistant Examiner*—Sanh Phu
(74) *Attorney, Agent, or Firm*—Armstrong, Kratz, Quintos, Hanson & Brooks, LLP (57) ABSTRACT

A portable wireless terminal device which has a main body including a first case provided with a plurality of manual keys, a second case provided with a display having a rectangular screen of a predetermined aspect ratio, and a connecting mechanism for interconnecting the two cases. The connecting mechanism includes a pivot mechanism for rotating the second case relative to the first case along a plane parallel to the screen. For wireless communication, the display is activated in a screen position wherein the screen is elongated vertically. For receiving a television broadcast, the display is activated in a screen position wherein the screen is elongated horizontally.

4 Claims, 14 Drawing Sheets

A-A SECTION

B-B SECTION

PORTABLE WIRELESS TERMINAL DEVICE

BACKGROUND OF THE INVENTION

1. Field of the Invention

The present invention relates to portable wireless terminal devices, such as portable telephones, which have a rectangular display screen.

2. Description of the Related Art

Portable telephones have made enormous progress in recent years as portable information processing terminal devices having not only a telephone communications function but also a mail function, an internet function and a camera function and adapted to process a wide variety of information. Efforts are recently made to develop portable telephones having a television broadcast receiving function (see, for example, JP-A No. 1999-215217).

Common portable telephones have a vertically elongated case to ensure portability. The case has a receiver at the upper end of the front side thereof, a transmitter at the lower end of the front side, and a plurality of manual keys and a display in the region between the receiver and the transmitter. The display is in the form of a vertically elongated rectangle in conformity with the vertically elongated shape of the case. When the portable telephone having such a vertically elongated display is given the television broadcast receiving function to present television broadcast images on the display screen, a black strip appears on the upper and lower sides of the screen, giving rise to the problem that the screen cannot be used in its entirety for displaying images, because the received images have a horizontally elongated rectangular contour corresponding to the aspect ratio of horizontally elongated television receiver screens.

Figure 15:
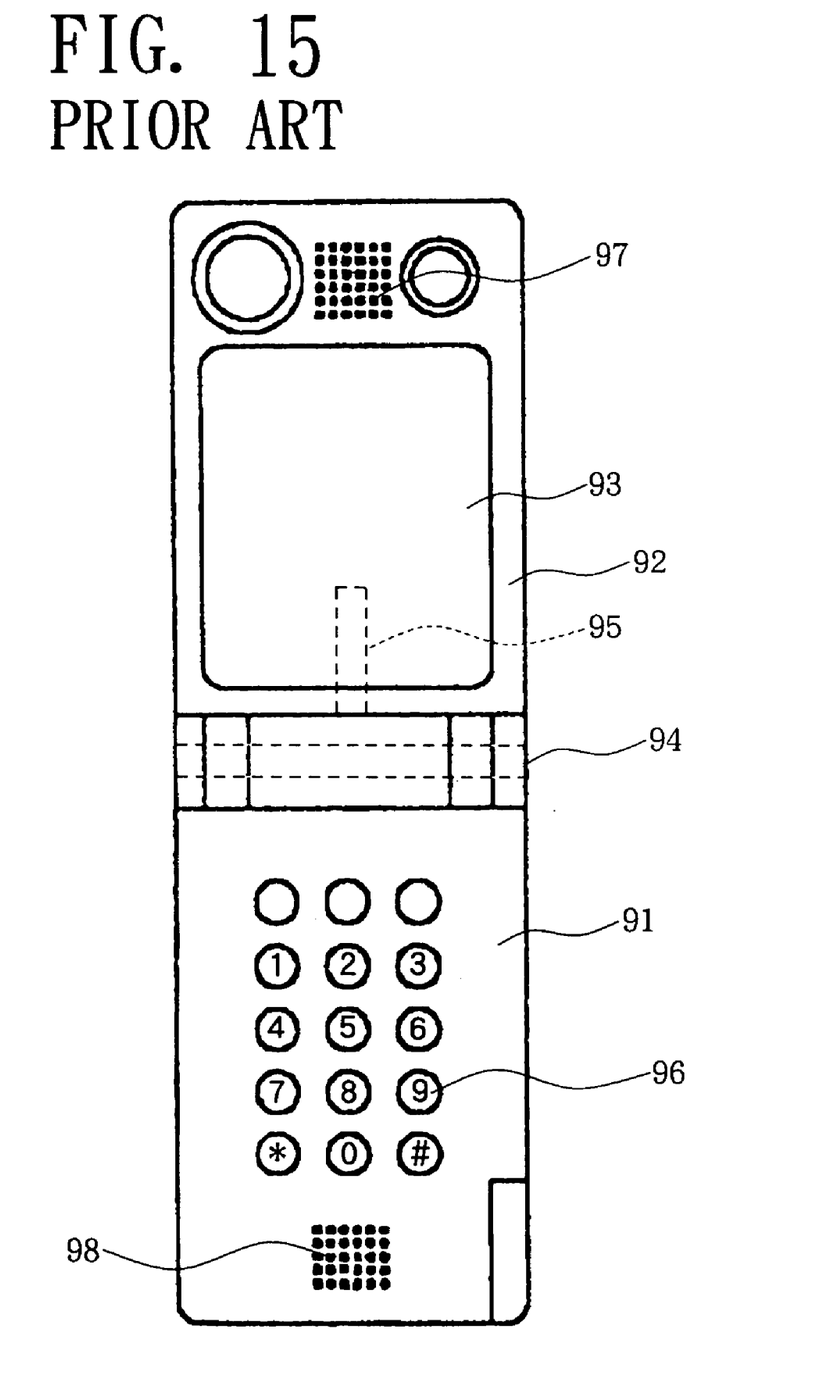
FIG. 15 is a front view of a conventional portable telephone.
Figure 16:
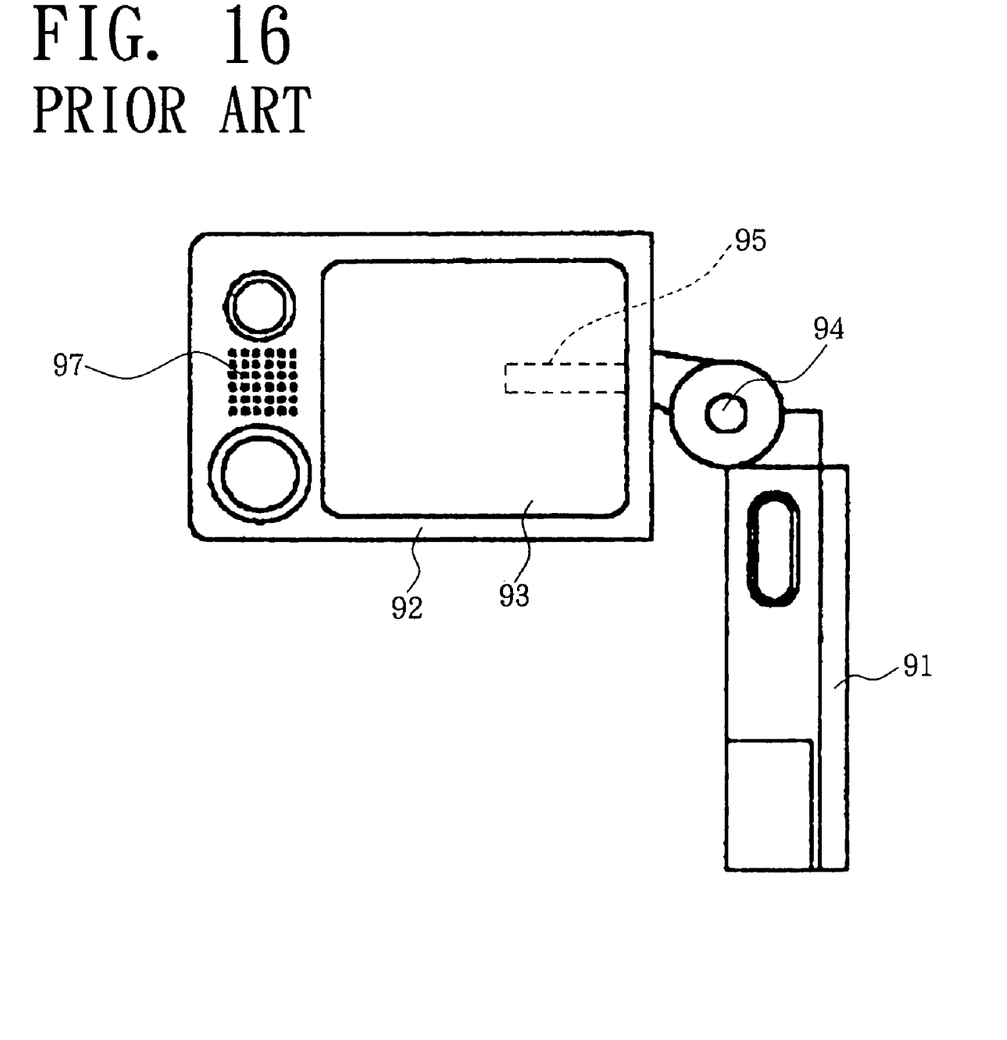
FIG. 16 is a front view showing the telephone with a flip portion thereof rotated about a first pivot and a second pivot.

For example, FIGS. 15 and 16 show a portable telephone which is proposed to overcome the above problem and wherein a flip portion 92 is supported by a first pivot 94 and a second pivot 95 on a main portion 91 (see JP-A No. 2001-169166). With this telephone, the main body 91 has a plurality of manual keys 96 on the front side thereof and a transmitter 98 below the arrangement of keys 96. The flip portion 92 is provided with a display 93 having a vertically elongated rectangular screen on the front side thereof and a receiver 97 above the display 93.

When the wireless telephone function of the above portable telephone is utilized in the case where the telephone is adapted to serve the television broadcast receiving function, the screen of the display 93 is positioned as vertically elongated as shown in FIG. 15, while when the television broadcast receiving function is activated, the flip portion is turned about the first pivot 94 and the second pivot 95 to position the display screen as horizontally elongated as shown in FIG. 16. This makes it possible to display the received images over the entire screen of the display 93.

However, when the display 93 is positioned face-to-face with the user for the user to watch television broadcast as shown in FIG. 16, the manual keys 96 on the main portion 91 will face sideways as viewed by the user. The conventional telephone shown in FIG. 15 accordingly has the problem that the keys 96 are difficult to manipulate for a change of channel or in response to an incoming call since the keys are not positioned face-to-face with the user.

SUMMARY OF THE INVENTION

An object of the present invention is to provide a portable wireless terminal device having a display screen adapted to present in its entirety received images of television broadcasts and manual keys which are easy to manipulate even while the user is watching the television broadcast.

The present invention provides a portable wireless terminal device comprising a portable main body and having a television broadcast receiving function and a wireless communications function, the main body having a plurality of manual keys and a display provided on a front side thereof. The main body comprises a first case having the plurality of keys, a second case having the display, and a connecting mechanism for interconnecting the two cases, the display comprising a screen having a predetermined aspect ratio. The connecting mechanism comprises a pivot mechanism for rotating the second case relative to the first case along a plane parallel to the screen. For wireless communication, the display is activated in a first screen position wherein the screen is elongated vertically, while for receiving a television broadcast, the display is activated in a second screen position wherein the screen is elongated horizontally.

When the wireless communications function is to be utilized, the screen of the display is brought into the first screen position, whereby the display is positioned as elongated vertically in alignment with the main body for the display to present on its screen information required for wireless communication.

When the television broadcast receiving function is to be utilized, on the other hand, the display screen is rotated through 90 degrees relative to the first case to the second screen position, whereby the display is positioned as elongated horizontally in conformity with the aspect ratio of horizontally elongated received images of television broadcasts. This makes it possible to utilize the entire screen of the display for showing television broadcast received images.

Both the display and the manual key arrangement are provided on the front side of the main body, and the screen of the display is rotatable from the first screen position to the second screen position on a plane by the rotation of the second case, so that both the display and the manual key arrangement remain facing toward the user even after the rotation of the second case. This enables the user to manipulate keys easily while watching the television broadcast.

Stated more specifically, the connecting mechanism comprises a slide mechanism for slidingly moving the second case relative to the first case in a direction orthogonal to both a pivot of the pivot mechanism and the direction of arrangement of the two cases, and the distance between the first case and the second case can be shortened when the display is in the first screen position or the second screen position. This specific construction enables the user to watch the television broadcast, with the display positioned close to the first case by slidingly moving the second case.

Further stated more specifically, the connecting mechanism comprises a latch structure for softly holding the second case in the first screen position and the second screen position relative to the first screen. With this specific construction, when the screen of the display is in the first screen position, the second case is softly held in this posture by the latch structure and is held in this posture unless the second case is subjected to a great force. Further when the display screen is in the second screen position, the second case is softly held in this posture by the latch structure and is held in this posture unless the second case is subjected to a great force. Accordingly the second case is unlikely to move freely against the will of the user, with the display screen set in the first or second screen position.

With the portable wireless terminal device of the invention described above, television broadcast received images can be presented on the display screen in its entirety, and the user can readily manipulate manual keys while watching the television broadcast.

DETAILED DESCRIPTION OF EMBODIMENTS

With reference to the drawings, a detailed description will be given below of foldable portable telephones embodying the present invention.

First Embodiment

Figure 1:
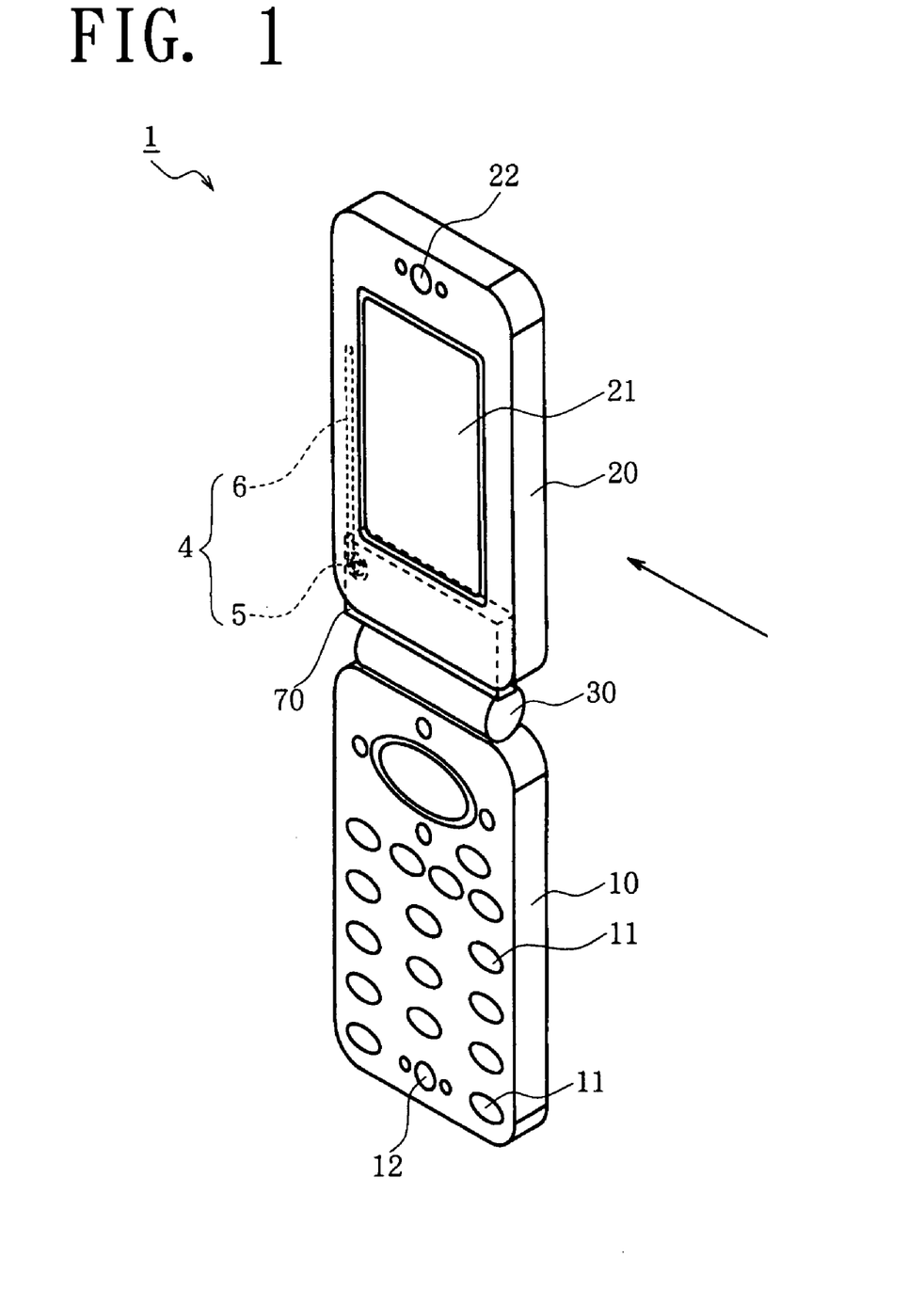
FIG. 1 is a perspective view of a foldable portable telephone according to the invention.

The foldable portable telephone of the present invention has a television broadcast receiving function and a wireless communications function. The telephone has a main body 1, which comprises a first case 10 vertically elongated as shown in FIG. 1, a second case 20 similarly vertically elongated, a hinge mechanism 30 for making the two cases 10, 20 closable or openable, and a connecting mechanism 4 for making the two cases 10, 20 rotatable and slidable relative to each other. The connecting mechanism 4 comprises a pivot mechanism 5 for rotating the second case 20 relative to the first case 10, and a slide mechanism 6 for slidingly moving the second case 20 relative to the first case 10. The lower end of the second case 20 is connected to the upper end of the first case 10 by the hinge mechanism 30 and the connecting mechanism 4, whereby the first case 10 and the second case 20 are closable toward or openable from each other by the action of the hinge mechanism 30.

The first case 10 has a flat rectangular front surface. The case 10 has a plurality of manual keys 11 arranged on the front side, and a transmitter 12 disposed below the arrangement of keys 11. Like the first case 10, the second case 20 has a flat rectangular front surface. Provided on the front side are a rectangular display 21 having a predetermined aspect ratio, with its long side positioned vertically in conformity with the vertically elongated shape of the main body 1, and a receiver 22 disposed above the display 21.

Figure 5:
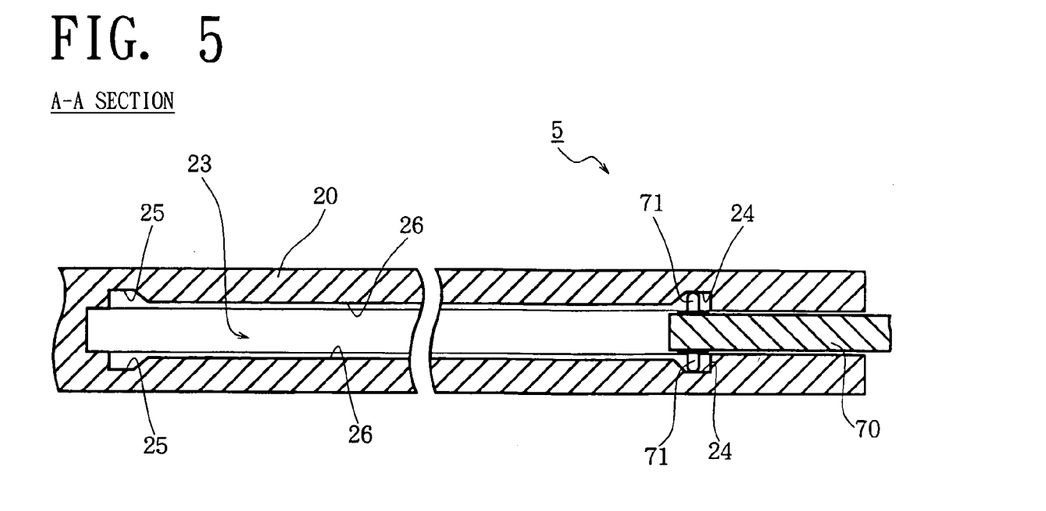
FIG. 5 is a view in section taken along the line A—A in FIG. 4.

The first case 10 is connected to one rotatable end of the hinge mechanism 30. Projecting from the other rotatable end of the mechanism 30 is a support plate 70 having a front surface and a rear surface which are parallel to the front surface of the second case 20. As shown in FIG. 5, a pair of engaging pins 71, 71 in alignment with each other are elastically supported on and retractably attached to the front and rear sides of the support plate 70.

Figure 4:
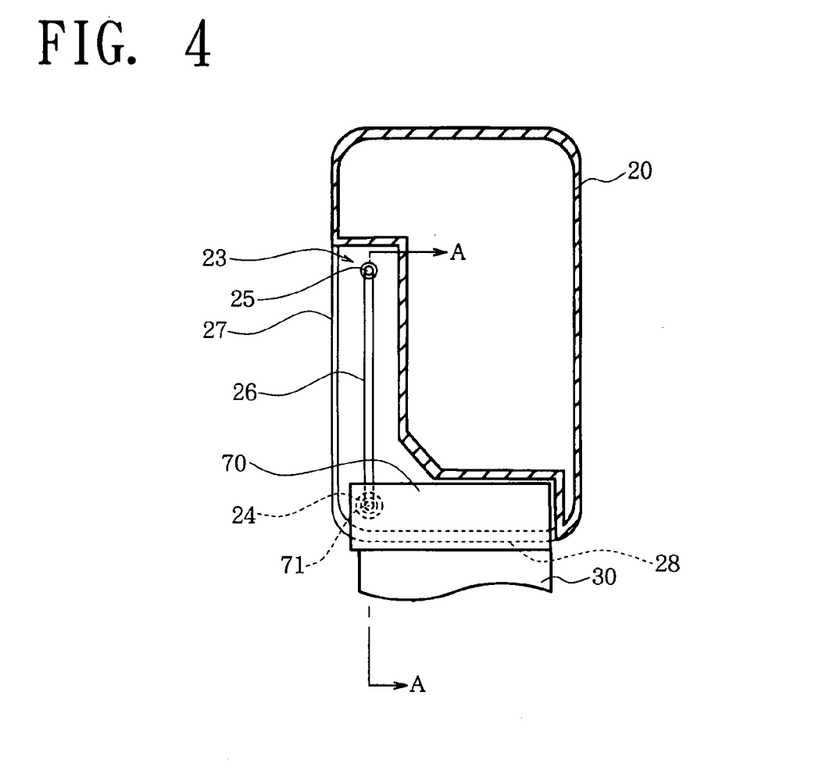
FIG. 4 is a sectional view showing the interior of the second case in the state of FIG. 1.

With reference to FIGS. 4 and 5, an L-shaped compartment 23 for movably accommodating the support plate 70 extends into the second case 20 from a lateral side wall 27 and end wall 28 thereof. The inner surfaces of the second case 20 defining the compartment 23 and opposed respectively to the front and rear surfaces of the support plate 70 are provided with a pair of slide grooves 26, 26 opposed to each other for guiding the sliding movement of the support plate 70. A first bearing portion 24 is formed at the lower end of each of the slide grooves 26, 26, and a second bearing portion 25 at the upper end thereof. The engaging pins 71, 71 on the support plate 70 are slidably fitted in the respective slide grooves 26 between the first bearing portions 24, 24 and the second bearing portions 25, 25. The pivot mechanism 5 comprises the pair of first bearing portions 24, 24 of the compartment 23 and the pair of engaging pins 71, 71 projecting from the respective front and rear sides of the support plate 70.

When positioned as opposed to the first bearing portions 24, 24, the outer ends of the engaging pins 71, 71 project from the support plate 70 into bearing contact with the bottoms of the first bearing portions 24, 24 and are engaged in the first bearing portions 24, 24 as shown in FIG. 5, whereby the engaging pins 71, 71 are softly held in the bearing portions 24, 24. In this held state, the second case 20 is rotatable about the engaging pins 71, 71 serving as pivots. The slide mechanism 6 comprises the pair of slide grooves 26, 26 formed in the inner surfaces of the second case 20 defining the support plate compartment 23 and the pair of engaging pins 71, 71 projecting from the front and rear sides of the support plate 70.

Figure 2:
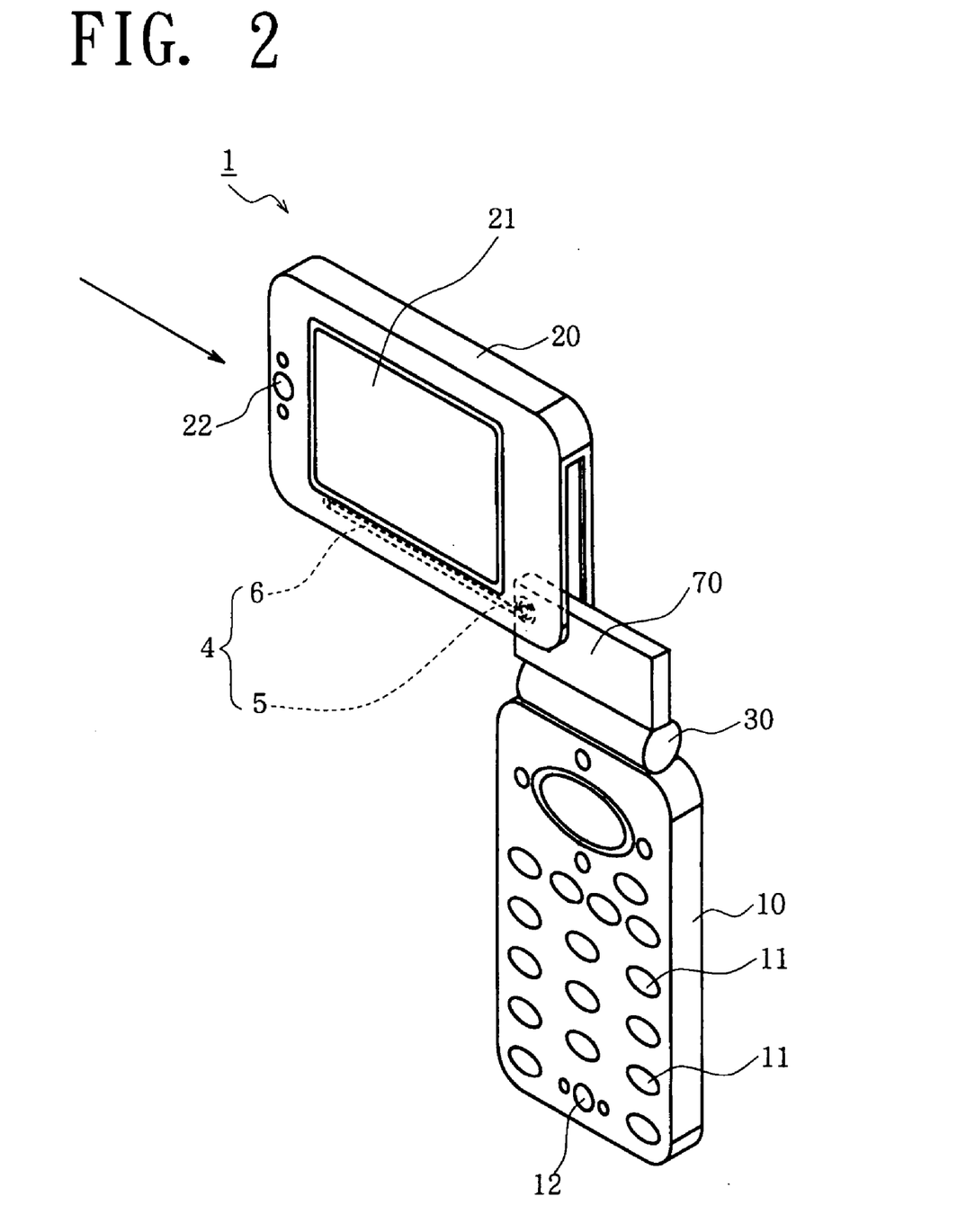
FIG. 2 is a perspective view showing the telephone with a second case thereof rotated through 90 degrees.
Figure 6:
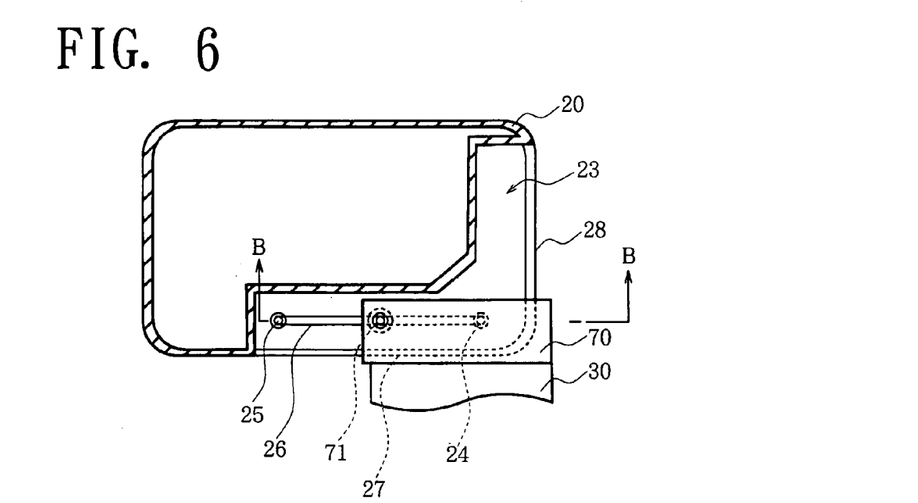
FIG. 6 is a sectional view showing the process of rotating the second case through 90 degrees and thereafter slidingly moving the second case relative to the first case.
Figure 7:
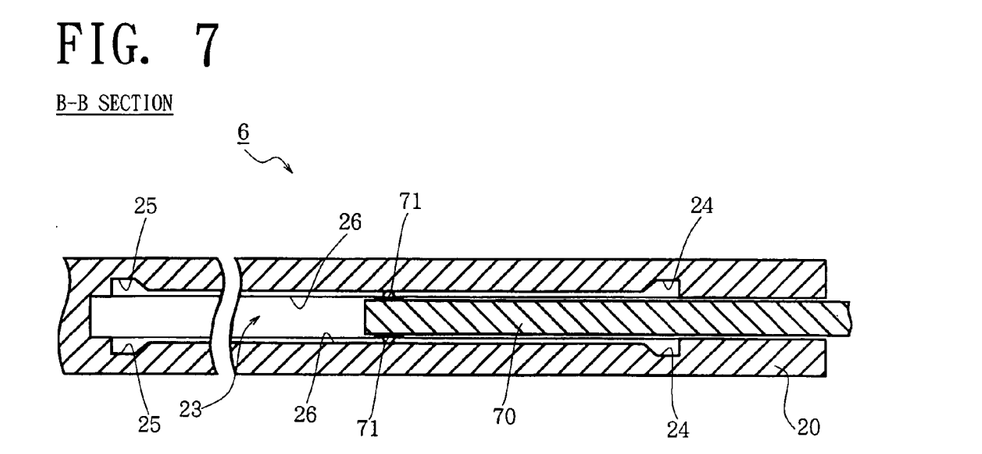
FIG. 7 is a view in section taken along the line B—B in FIG. 6.

When the second case 20 as turned through 90 degrees relative to the first case 10 by the action of the pivot mechanism 5 is pushed sideways as shown in FIG. 2, the engaging pins 71, 71 are released from soft holding engagement with the first bearing portions 24, 24. The pins 71, 71 released slidingly move along the slide grooves 26, 26, whereby the movement of the second case 20 is guided as shown in FIG. 6.

When the foldable portable telephone of the invention is to be used to make a telephone call, the first case 10 and the second case 20 are opened by the action of the hinge mechanism 30 as shown in FIG. 1, whereby the screen of the display 21 is set in a vertically elongated screen position, and required information such as the telephone number of the incoming caller is presented on the screen of the display 21.

Further when a television broadcast is to be watched, the second case 20 in its opened position is pushed sideways as shown in FIG. 1, whereby the second case 20 is rotated through 90 degrees about the engaging pins 71, 71 by the action of the pivot mechanism 5. The rotation brings the display screen of the second case 20 from the vertically elongated screen position shown in FIG. 1 to a horizontally elongated position shown in FIG. 2. Further with the rotation, the orientation of the image on the display 21 relative to the screen thereof is changed toward a direction 90 degrees different for the display to show images as oriented normally for the horizontally elongated screen.

Since the engaging pins 71, 71 are positioned perpendicular to the surface of the second case 20, the screen of the display 21 of the second case 20 is rotated on the same plane at this time. The display 21 of the second case 20 and the arrangement of manual keys 11 on the first case 10 are therefore both positioned face-to-face with the user even after the rotation of the second case 20.

Figure 3:
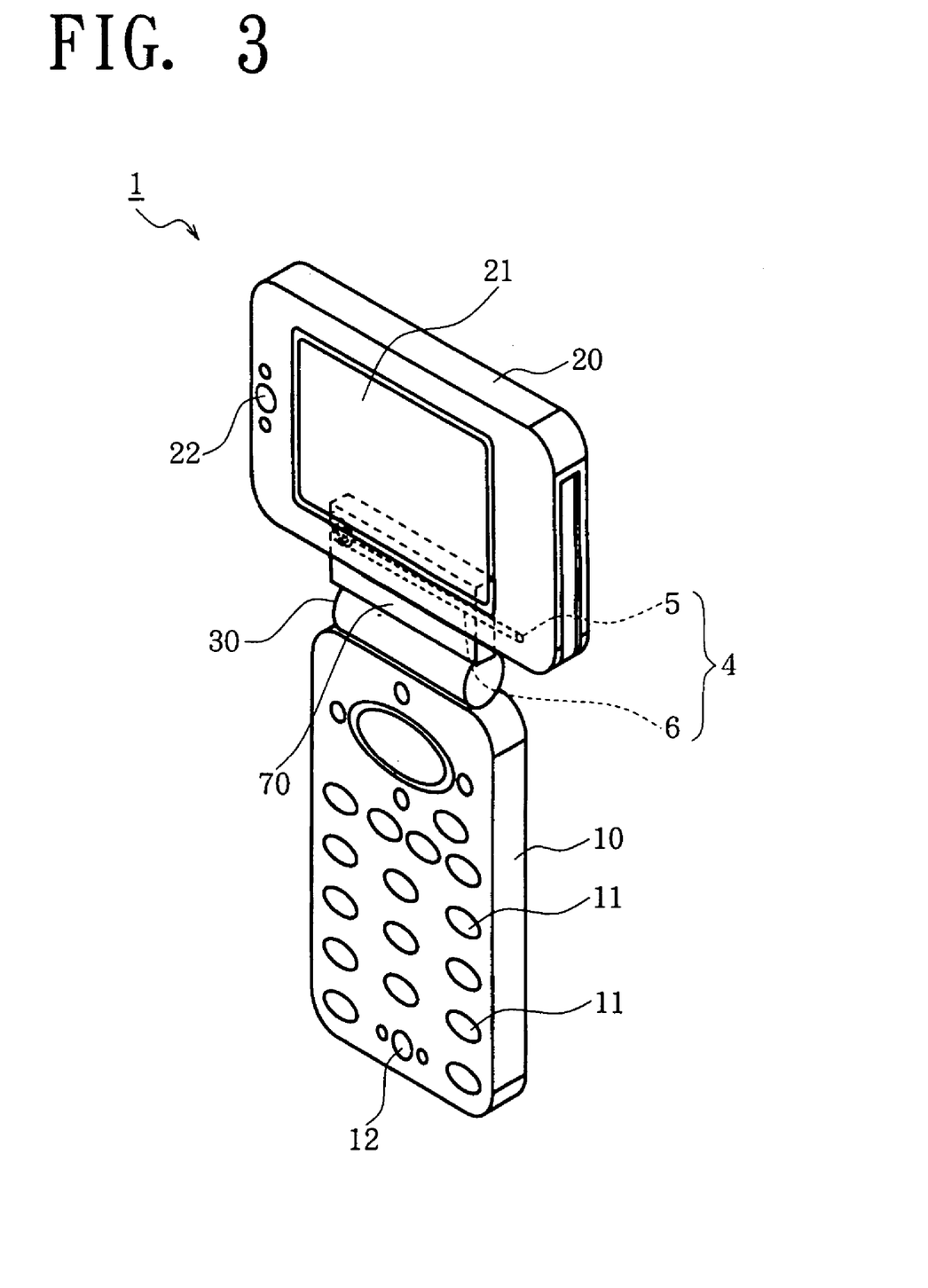
FIG. 3 is a perspective view showing the telephone with its second case brought closer to a first case.

The second case 20 is further pushed sideways as indicated by an arrow in FIG. 2, with the display screen of the second case 20 in the horizontally elongated screen position illustrated. This releases the engaging pins 71, 71 from soft holding engagement with the first bearing portions 24, 24, bringing the second case 20 closer to the first case 10 relative thereto by the action of the slide mechanism 6 as shown in FIG. 3.

The slide grooves 26 for guiding the movement of the second case 20 are formed on planes parallel to the screen of the display 21 of the second case 20. Accordingly, the screen of the display 21 of the second case 20 and the arrangement of manual keys 11 on the first case 10 are positioned face-to-face with the user even after the movement of the second case 20.

With the foldable portable telephone of the present invention, the screen of the display 21 can be utilized in its entirety for displaying received images of television broadcasts. Since the display 21 and the arrangement of manual keys 11 are both positioned face-to-face with the user even while the user is watching the television broadcast, the user can readily manipulate keys while watching the television broadcast.

Furthermore, the second case 20 is brought close to the first case 10, with both the screen of the display 21 of the second case 20 and the arrangement of key 11 on the first case 10 positioned as opposed to the user. This enables the user to watch the television broadcast on the main body 1 as compacted widthwise thereof.

Second Embodiment

Figure 8:
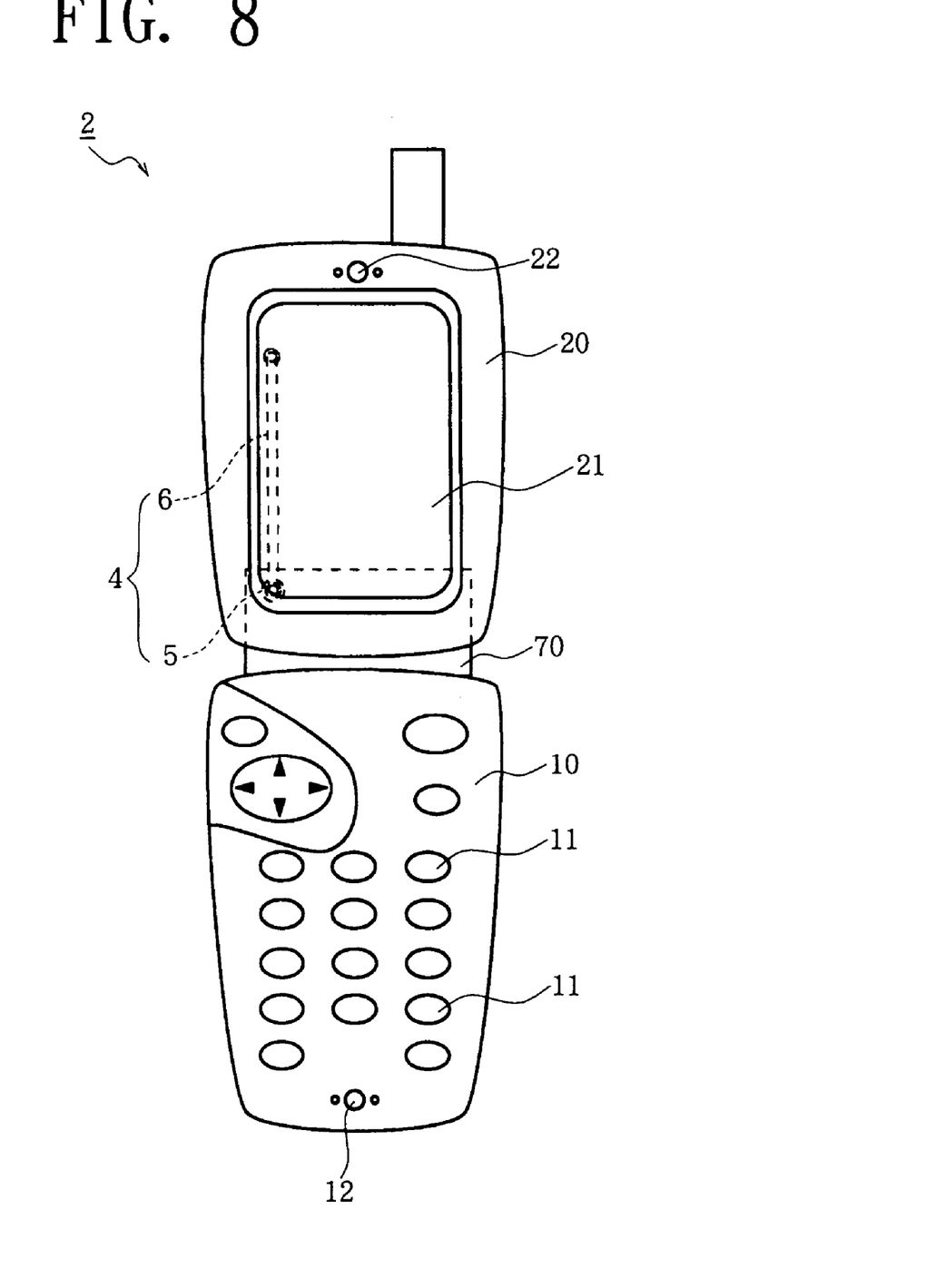
FIG. 8 is a front view of a portable telephone of a second embodiment.
Figure 9:
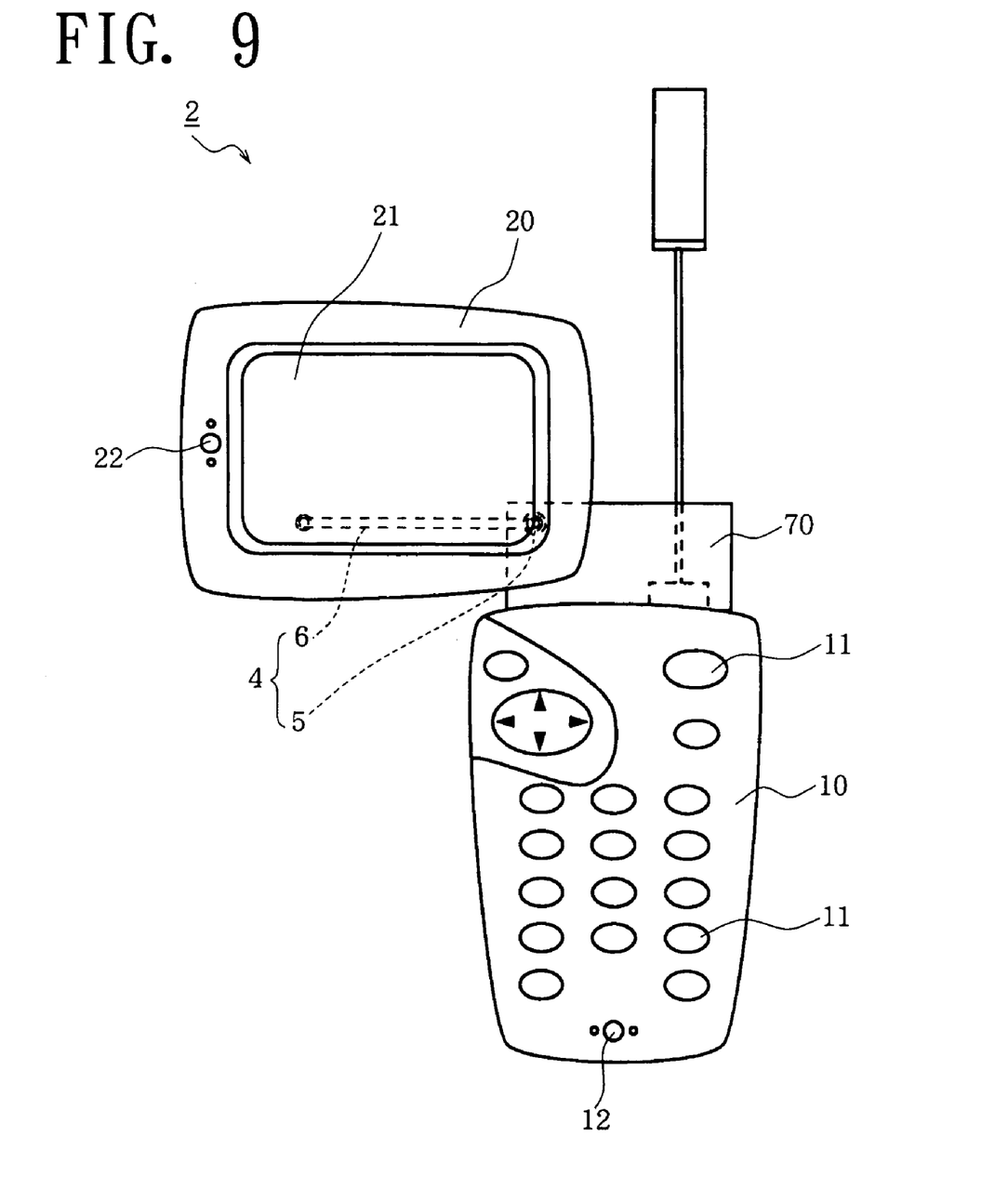
FIG. 9 is a front view showing the telephone with a second case thereof rotated through 90 degrees.
Figure 10:
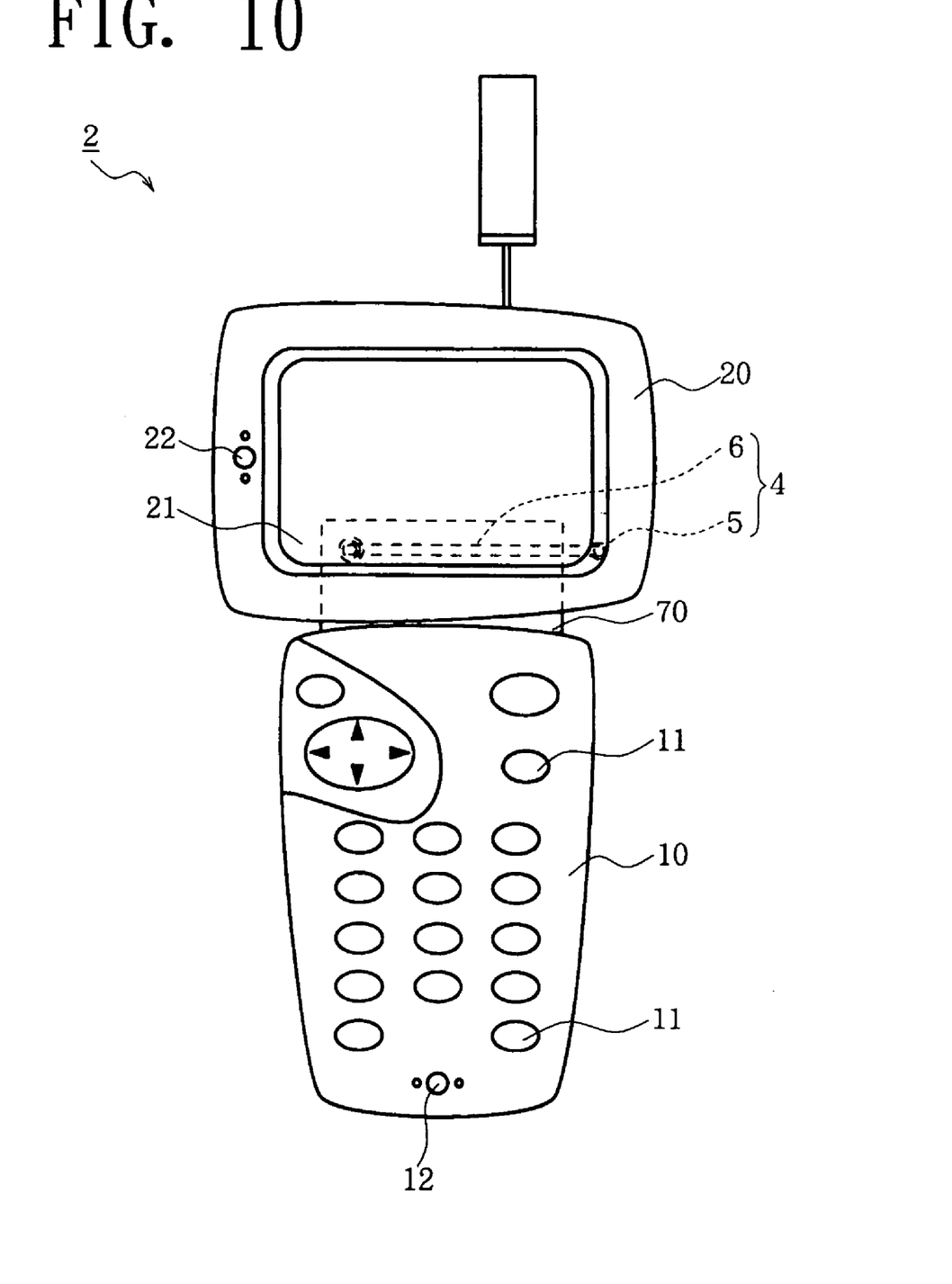
FIG. 10 is a front view showing the telephone with its second case brought closer to a first case.

FIGS. 8 to 10 show a portable telephone of this embodiment, wherein a second case 20 is rotatable and slidable relative to the first case 10 by the same connecting mechanism 4 as in the first embodiment, whereas the main body 2 of this embodiment has no hinge mechanism. The first case 10 and the second case 20, both vertically elongated, are attached to each other only by the connecting mechanism 4.

Stated more specifically, a support plate 70 is attached to the upper end of the first case 10, and engaging pins 71, 71 projecting from the front side and rear side of the support plate 70 are slidably fitted in respective slide grooves 26, 26 between first bearing portions 24, 24 and second bearing portions 25, 25. The grooves 26, 26 are formed in the inner surfaces of the second case 20 which define a compartment 23 for accommodating the support plate. In this way, the same pivot mechanism 5 and slide mechanism 6 as in the first embodiment are provided.

In the course of the movement of the second case 20 relative to the first case from a position shown in FIG. 8 for using a telephone function to a position shown in FIG. 10 for receiving a television broadcast, a display 21 of the second case 20 moves on the same plane. This enables the user to watch the television broadcast on the display 21 with the received images presented on the entire screen thereof and to readily manipulate keys while watching the television broadcast.

Third Embodiment

FIGS. 11 to 14 show a portable telephone of this embodiment which has the same construction as the first embodiment except the construction for rotating and slidingly moving a second case 80 relative to a first case 10 by the action of a connecting mechanism 40. Accordingly, a description will be given only of the construction for rotating and slidingly moving the second case 80 by the action of the connecting mechanism 40. As to the other construction, like parts are designated by like reference numerals for the other construction and will not be described repeatedly.

Figure 11:
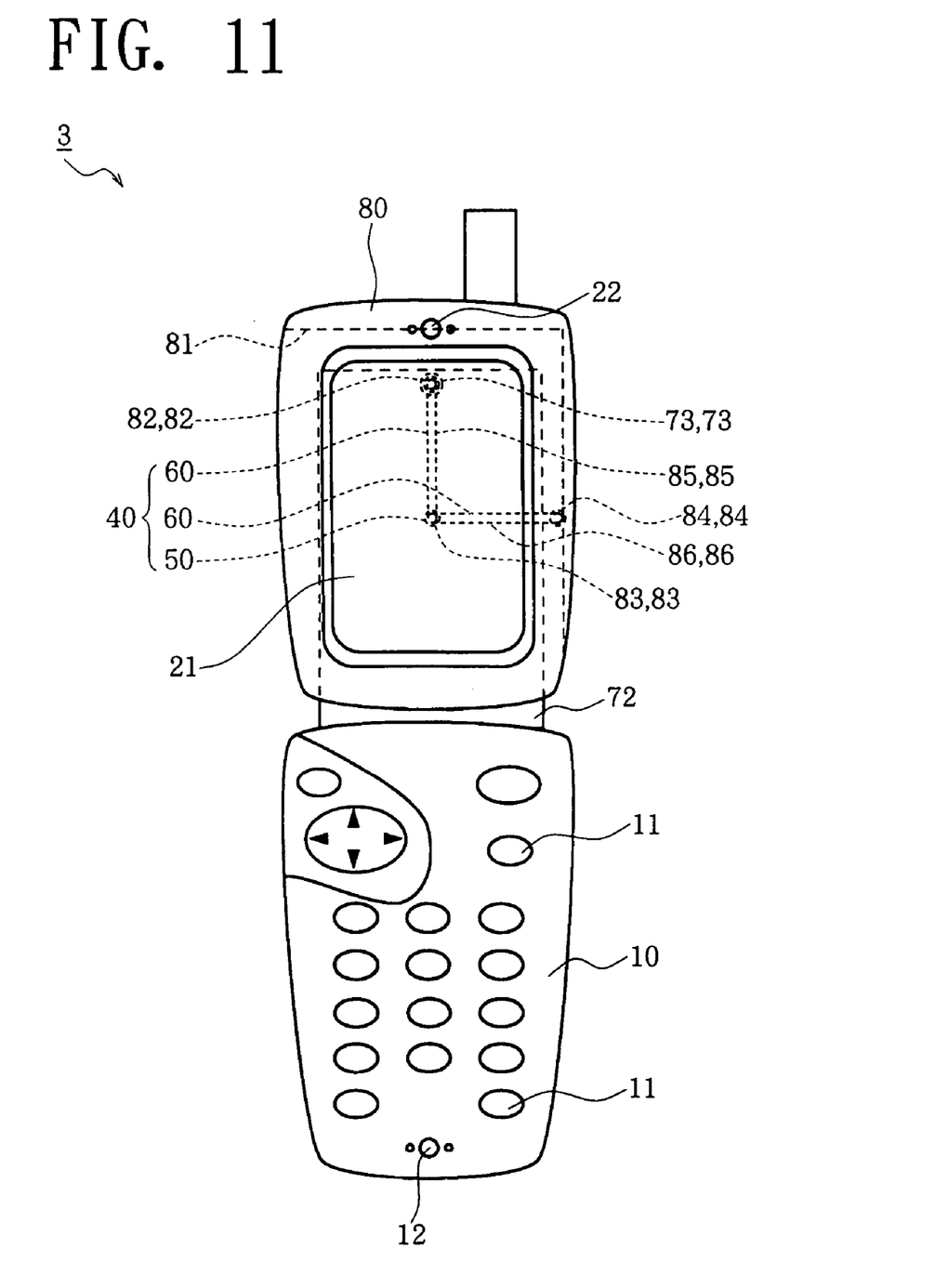
FIG. 11 is a front view of a portable telephone of a third embodiment.

With reference to FIG. 11, a support plate 72 has a front surface and a rear surface which are parallel to the surface of the second case 80 and is attached to the upper end of the first case 10. A pair of engaging pins 73, 73 in alignment with each other are elastically supported on and retractably attached to the front and rear sides of the support plate 72. The second case 80 is internally provided with a compartment 81 for movably accommodating the support plate 72. The inner surfaces of the second case 80 defining the compartment 81 and opposed respectively to the front and rear surfaces of the support plate 72 are provided with a pair of first slide grooves 85, 85 opposed to each other for guiding the sliding movement of the support plate 72. The first slide grooves 85, 85 extend longitudinally of the second case 80 and have first bearing portions 82, 82 at their upper ends and second bearing portions 83, 83 at their lower ends.

The compartment-defining inner surfaces of the second case 80 have a pair of second slide grooves 86, 86 orthogonal to the first slide grooves 85, 85 and each having the second bearing portion 83 as one end. A third bearing portion 84 is formed at the other end of each second slide groove 86. The engaging pins 73, 73 on the support plate 72 are slidably fitted in the first slide grooves 85 or the second slide grooves 86 between the first bearing portions 82, 82 and the third bearing portions 84, 84.

A pivot mechanism 50 comprises the pair of second bearing portions 83, 83 formed in the compartment-defining inner surface of the second case 80, and the pair of engaging pins 73, 73 projecting from the front and rear sides of the support plate 72. When positioned as opposed to the second bearing portions 83, 83, the engaging pins 73, 73 are softly held in the second bearing portions 83, 83. The second case 80 is rotatable about the pins 73, 73 in this state.

A slide mechanism 60 comprises the pair of first slide grooves 85, 85 and the pair of second slide grooves 86, 86 which are formed in the compartment-defining inner surfaces of the second case 80, and the pair of engaging pins 73, 73 projecting from the front and rear sides of the support plate 72. When the second case 80 is pulled away from the first case 10 with the upper end of the first case 10 opposed to the lower end of the second case 80 as shown in FIG. 11, the engaging pins 73, 73 are released from the first bearing portions 82, 82. The pin 73, 73 thereafter slidingly move along the first slide grooves 85, 85, permitting the second case 80 to move away from the first case 10 as seen in FIG. 12.

Figure 13:
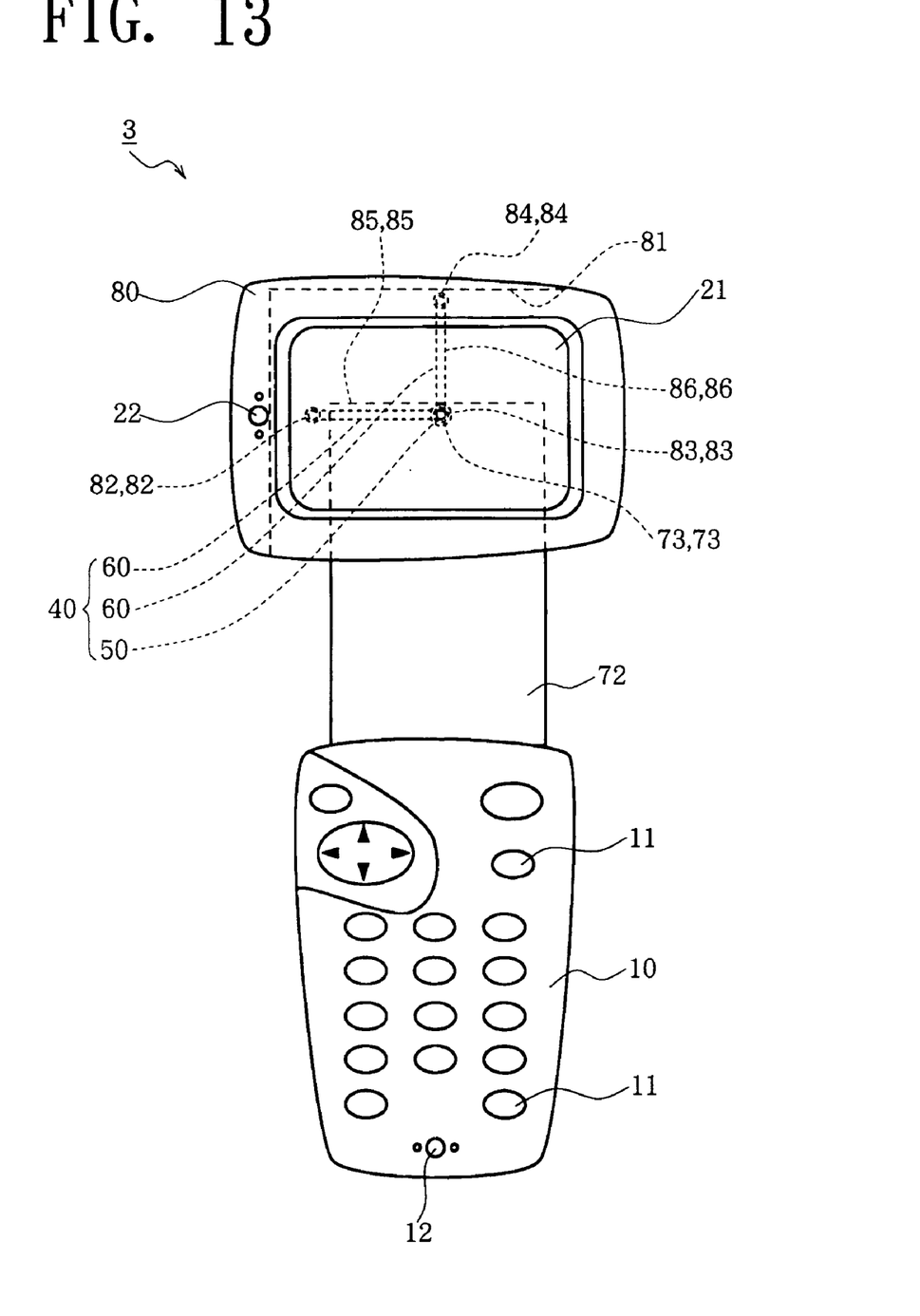
FIG. 13 is a perspective view showing the telephone with the second case thereof rotated through 90 degrees.
Figure 14:
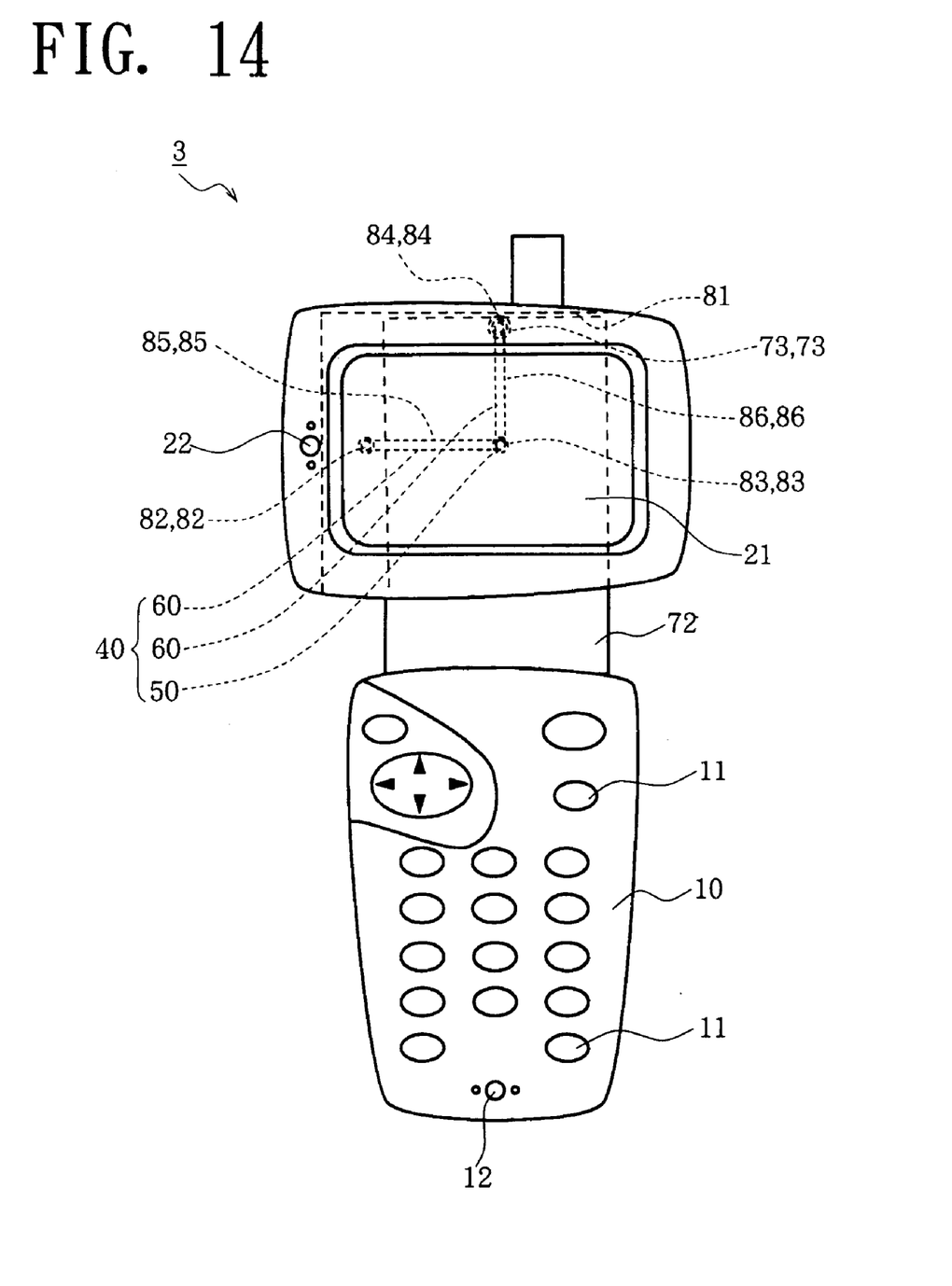
FIG. 14 is a perspective view showing the telephone with its second case brought closer to the first case.

When the second case 80, as rotated through 90 degrees relative to the first case 10 by the pivot mechanism 50 as shown in FIG. 13, is pushed from one side thereof, the engaging pins 73, 73 are released from soft holding engagement with the second bearing portions 83, 83. The released pins 73, 73 slidingly move along the second slide grooves 86, 86, permitting the second case 80 to move toward the first case 10 as shown in FIG. 14.

When a television broadcast is to be watched using the portable telephone of the present embodiment, the second case 80 is first pulled away from the first case 10 with the main body 3 in a contracted state as shown in FIG. 11. This releases the engaging pins 73, 73 from the first bearing portions 82, 82, and the slide mechanism 60 acts to move the second case 80 to a position where the pins 73, 73 are opposed to the second bearing portions 83, 83 as shown in FIG. 12.

Figure 12:
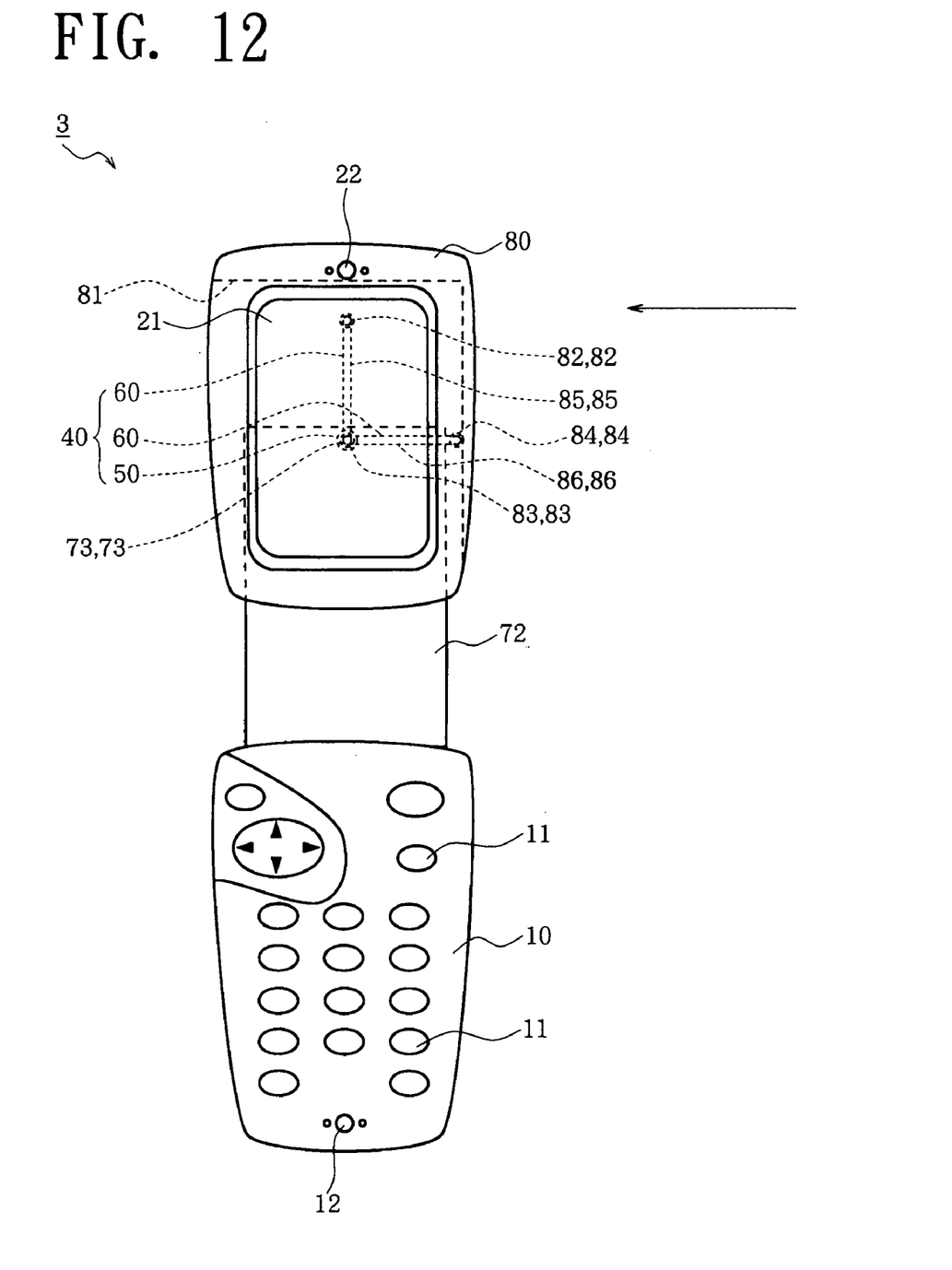
FIG. 12 is a front view showing the telephone with a second case thereof moved away from a first case.

Subsequently, the second case 80 in the state shown in FIG. 12 is pushed sideways as indicated by an arrow, whereby the case 80 is rotated through 90 degrees about the engaging pins 73, 73 by the action of the pivot mechanism 50. The rotation shifts the screen of the display 21 of the second case 80 from the vertically elongated screen position shown in FIG. 12 to the horizontally elongated screen position shown in FIG. 13. Further the rotation changes the orientation of the image on the display 21 relative to the screen toward a direction 90 degrees different, permitting the display 21 to show images as positioned normally for the horizontally elongated screen.

Since the engaging pins 73, 73 are positioned perpendicular to the surface of the second case 80, the screen of the display 21 in the case 80 rotates on the same plane at this time. Consequently, the display 21 of the second case 80 and the arrangement of key 11 are both positioned face-to-face with the user even after the rotation.

The second case 80 is further pushed toward the first case 10 with the screen of the display 21 of the second case 80 set in the horizontally elongated position as seen in FIG. 13. This releases the engaging pins 73, 73 from soft holding engagement with the second bearing portions 83, 83, permitting the slide mechanism 60 to move the second case 80 toward the first case 10. As a result, the pins 73, 73 engage in the third bearing portions 84, 84, positioning the display 21 in place close to the first case 10 as shown in FIG. 14.

The first slide grooves 85, 85 and the second slide grooves 86, 86 for guiding the movement of the second case 80 are formed on planes parallel to the screen of the display 21 of the second case 80, so that the display screen of the case 80 and the arrangement of manual keys 11 on the first case 10 are positioned face-to-face with the user even after the case 80 is thus moved.

Consequently, in the course of movement of the second case 80 relative to the first case 10 from the position of FIG. 11 wherein the telephone serves the function as a telephone to the position of FIG. 14 wherein the television broadcast is received, the display 21 moves on the same plane. This enables the user to view television broadcast images as presented on the entire screen of the display 21 and to readily manipulate keys while watching the television broadcast.

What is claimed is:

1. A portable wireless terminal device comprising a portable main body and having a television broadcast receiving function and a wireless communications function, the main body having a plurality of manual keys and a display provided on a front side thereof, the main body comprising:
    a first case having the plurality of keys;
    a second case having the display; and
    a connecting mechanism for interconnecting the two cases, the display comprising a screen having a predetermined aspect ratio, the connecting mechanism comprising:
    a pivot mechanism for rotating the second case relative to the first case along a plane parallel to the screen; and
    a slide mechanism for slidingly moving the second case relative to the first case along a plane parallel to the screen, the display being operable for wireless communication in a first screen position wherein the screen is elongated vertically, the display being operable for receiving a television broadcast in a second screen position wherein the screen is elongated horizontally.

2. A portable wireless terminal device according to claim 1, wherein the slide mechanism is for slidingly moving the second case relative to the first case in a direction orthogonal to both a pivot of the pivot mechanism and the direction of arrangement of the two cases, and the distance between the first case and the second case can be shortened when the display is in the first screen position or the second screen position.

3. A portable wireless terminal device according to claim 1, wherein the connecting mechanism comprises a latch structure for lightly holding the second case in the first screen position and the second screen position relative to the first screen.

4. A portable wireless terminal device comprising a portable main body and having a television broadcast receiving function and a wireless communications function, the main body having a plurality of manual keys and a display provided on a front side thereof, the main body comprising:
    a first case having the plurality of keys;
    a second case having the display; and
    a connecting mechanism for interconnecting the two cases, the display comprising a screen having a predetermined aspect ratio, the connecting mechanism comprising a pivot mechanism including a pivoting axis arranged at a corner of the second case for rotating the second case relative to the first case along a plane parallel to the screen, the display being operable for wireless communication in a first screen position wherein the screen is elongated vertically, the display being operable for receiving a television broadcast in a second screen position wherein the screen is elongated horizontally.

* * * * *